(12) United States Patent
Sieber

(10) Patent No.: US 7,836,689 B2
(45) Date of Patent: Nov. 23, 2010

(54) OSCILLATING WATER COLUMN ENERGY ACCUMULATOR

(76) Inventor: Joseph D. Sieber, 464 Balsam Street, Qualicum Beach, BC (CA) V9K 1H9

( * ) Notice: Subject to any disclaimer, the term of this patent is extended or adjusted under 35 U.S.C. 154(b) by 1361 days.

(21) Appl. No.: 11/302,260

(22) Filed: Dec. 14, 2005

(65) Prior Publication Data

US 2007/0132432 A1    Jun. 14, 2007

(51) Int. Cl.
F03B 13/18    (2006.01)
B01D 61/02    (2006.01)

(52) U.S. Cl. .................... 60/398; 290/53
(58) Field of Classification Search ............ 60/398; 290/53, 54
See application file for complete search history.

(56) References Cited

U.S. PATENT DOCUMENTS

| | | | |
|---|---|---|---|
| 4,208,878 A * | 6/1980 | Rainey .................... 60/398 |
| 4,277,690 A * | 7/1981 | Noren ..................... 290/53 |
| 4,466,244 A | 8/1984 | Wu | |
| 4,560,884 A | 12/1985 | Whittecar | |
| 4,698,969 A * | 10/1987 | Raichlen et al. ........... 60/398 |
| 5,179,837 A * | 1/1993 | Sieber ..................... 60/398 |
| 5,186,822 A * | 2/1993 | Tzong et al. .............. 60/398 |
| 6,457,307 B1 * | 10/2002 | Feldman et al. ........... 60/398 |
| 6,574,957 B2 * | 6/2003 | Brumfield ................ 60/398 |
| 2002/0162326 A1 | 11/2002 | Brumfield | |

FOREIGN PATENT DOCUMENTS

GB    109353 A    9/1917

* cited by examiner

*Primary Examiner*—Thomas E Lazo
(74) *Attorney, Agent, or Firm*—Clark Wilson LLP; Michael J. Roman

(57) ABSTRACT

The present invention relates to a method and apparatus for accumulating energy from an oscillating water column by transducing the water column oscillations to compress a fluid and accumulating the compressed fluid.

5 Claims, 6 Drawing Sheets

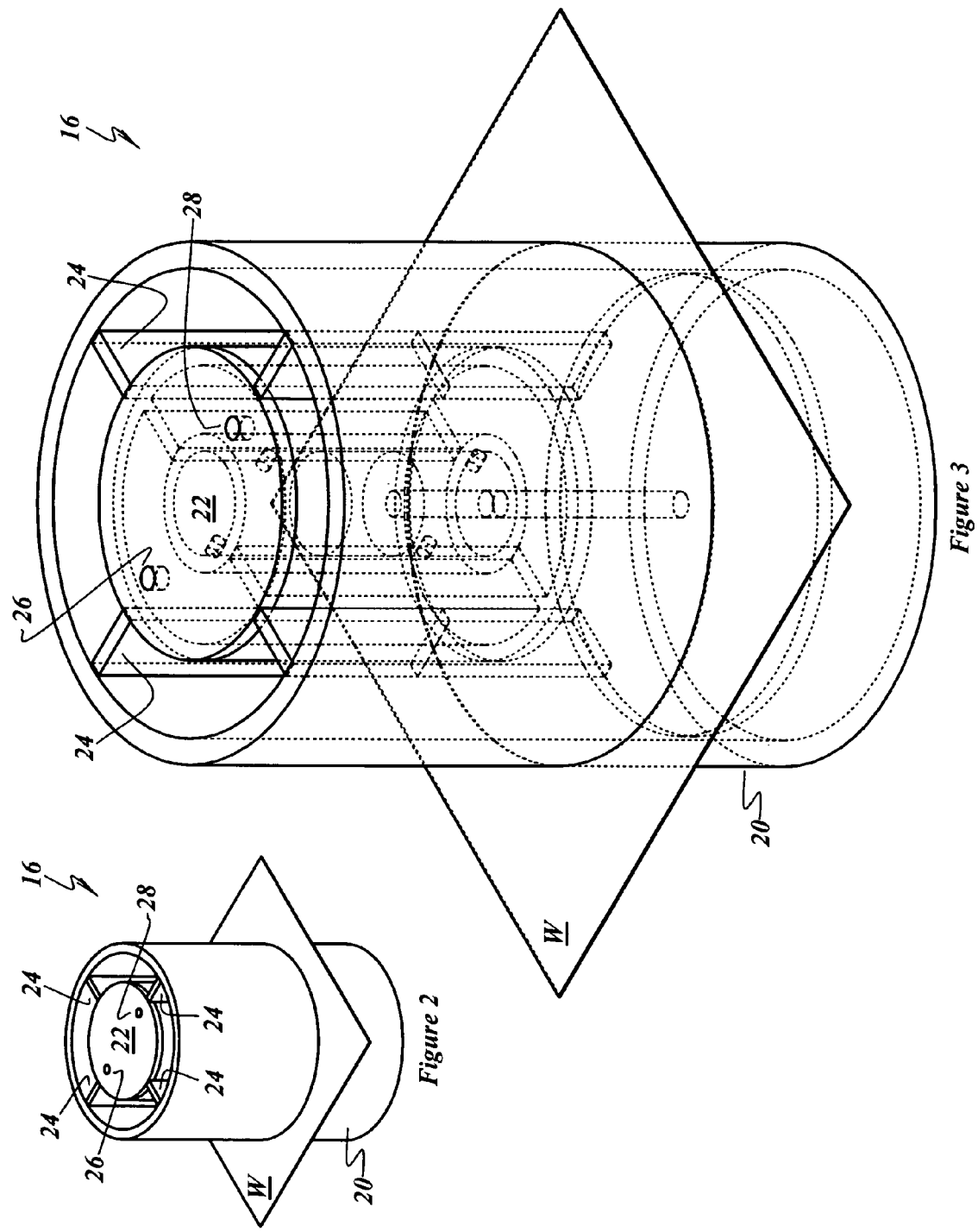

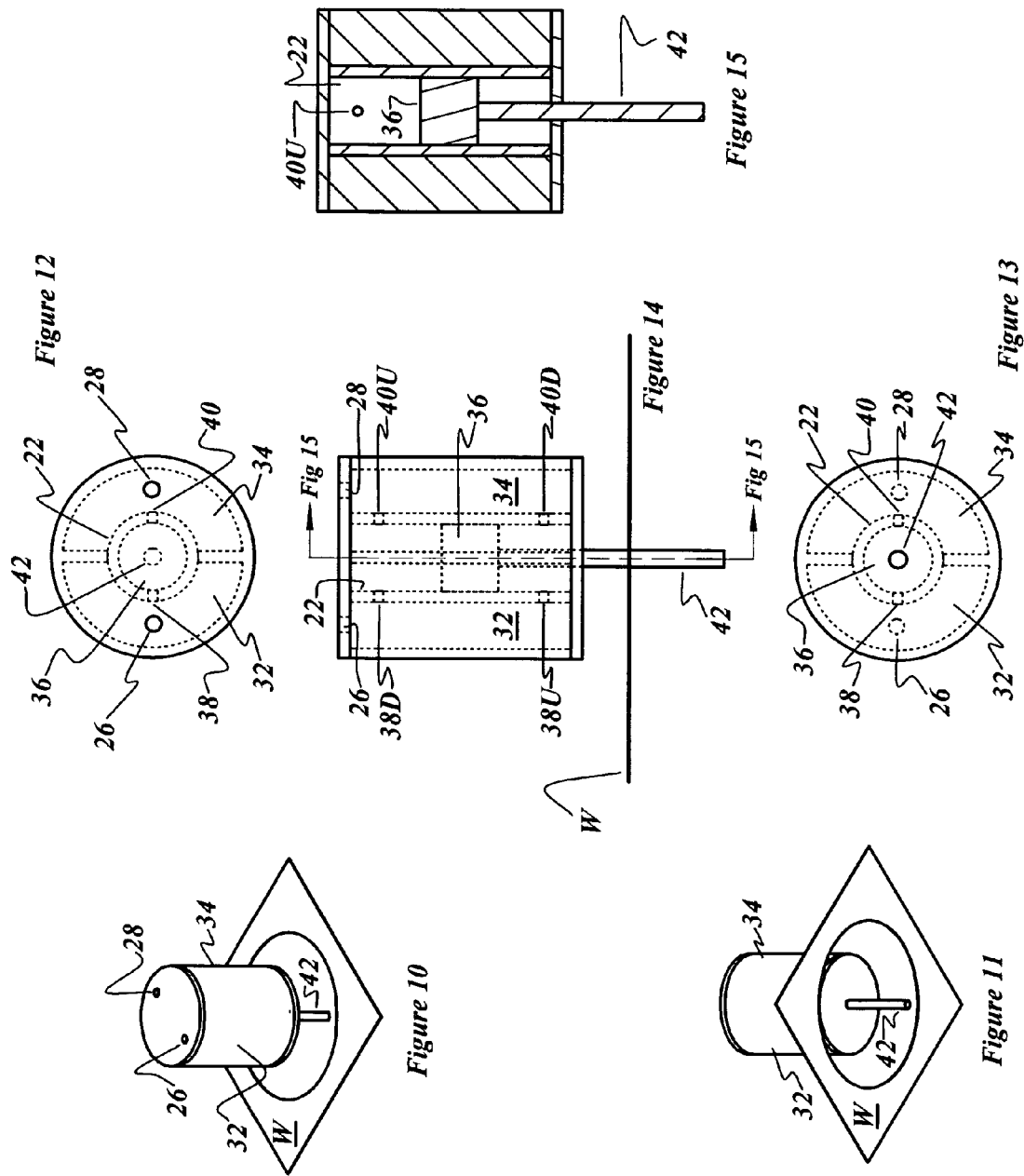

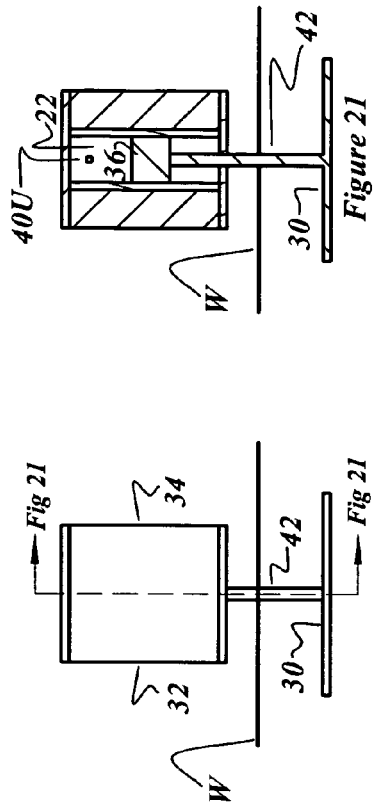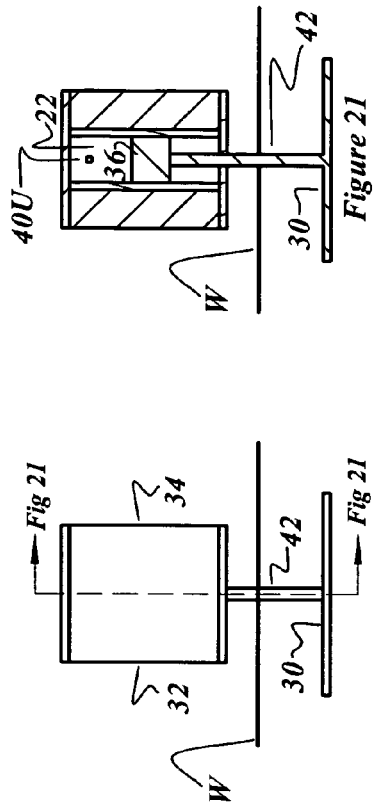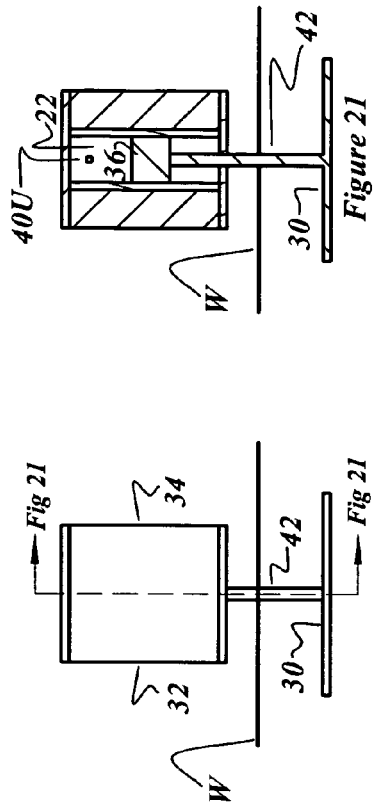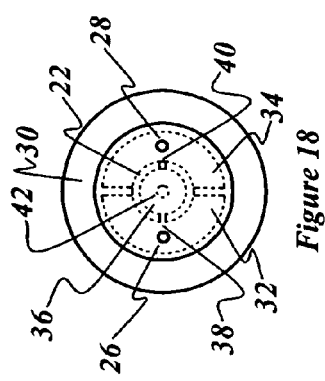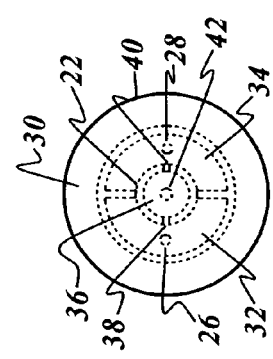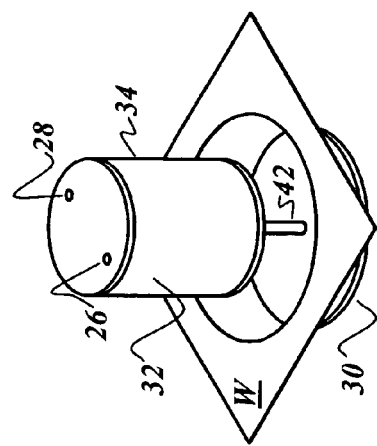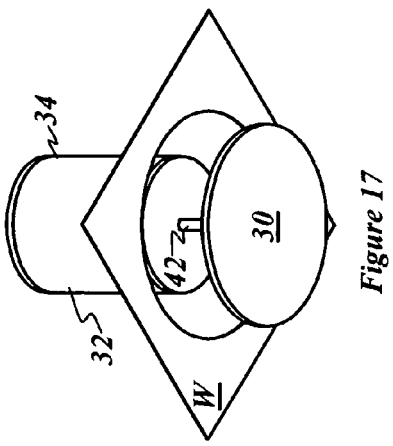

OSCILLATING WATER COLUMN ENERGY ACCUMULATOR

BACKGROUND OF THE INVENTION

1. Field of the Invention

The present invention relates to a method and apparatus for accumulating energy from an oscillating column of water.

2. Description of Related Art

Electrical generators that harness the power of an oscillating water column have been known for at least a number of decades. In general, these generators include a large chamber built at the shoreline of a body of water, the chamber both rising above and submerging below the water level at the shoreline. Such chambers are typically built along steep shorelines, or even into the faces of cliffs, where the difference in height between wave crests and wave troughs is pronounced.

The chamber includes a first opening submerged below water level and a second opening that vents to the atmosphere via a turbine, such that the chamber contains a column of water having a height approximately equal to the water level outside the chamber. As the crests and troughs of waves arrive at the chamber, the level of the water column within the chamber periodically rises and falls, thereby alternately forcing air within the chamber to vent through the turbine into the atmosphere and drawing air from the atmosphere back through the turbine to the chamber.

Although ingenious, these generators suffer from a number of disadvantages. First, the corrosive mixture of salt water and air typically found inside the chamber can cause parts, for example the turbine, to wear prematurely. Second, a turbine, which is a relatively expensive component, is required to harness the energy of each such water column; in other words, if a series of such chambers were constructed side-by-side, each would require its own turbine because of the difficulty of synchronizing the chambers' air-flows so as not to interfere with each other. Third, the bi-directional airflow pumped by the oscillating water column conventionally demands a self-rectifying turbine, typically a Wells turbine, which is generally less efficient than a non-rectifying turbine, particularly under large and small wave conditions.

Accordingly, what is needed therefore is a method and apparatus for accumulating energy from one or more oscillating water columns that is less subject to the above disadvantages.

SUMMARY OF THE INVENTION

The present invention is directed to this need.

In very general terms, the present invention accumulates energy from an oscillating water column instead of expending the energy directly. The accumulated energy may subsequently be used to power a machine, for example a turbine-generator-set.

In essence, the water column oscillations are transduced, either to compress a fluid accumulated in a system or to pressurize the system accumulating the fluid should the fluid be incompressible. When the fluid is expelled through decompression or depressurization as the case may be, its kinetic energy can be harnessed to power a machine, for example the turbine-generator-set. Desirably, the fluid may be expelled in a unidirectional flow to power a more efficient turbine than a self-rectifying turbine, such as a Wells turbine.

A number of these transducers may be connected together, for example in series to sum fluid pressure or in parallel to sum fluid volume, to power a single turbine-generator-set.

A machine powered by the accumulated fluid may be located remotely from the transducers and in particular the corrosive environment of a body of saltwater. With the transducers and the machine connected together as a closed system and the accumulated fluid being a fluid other than saltwater or another corrosive, the machine is further protected against wear.

More specifically then, according to one aspect of the present invention, there is provided a method of accumulating energy from an oscillating water column, comprising transducing the water column oscillations to compress a fluid and accumulating the compressed fluid. In this regard, transducing might include transducing when the water column is rising and transducing when the water column is falling.

Transducing and accumulating might include compressing a fluid to a first pressure, accumulating the fluid compressed to the first pressure, compressing the accumulated fluid to a second pressure, and accumulating the fluid compressed to the second pressure. In this regard, transducing and accumulating might include successively compressing and accumulating fluid at higher pressures.

The method might further include turning a turbine with the compressed fluid. The turbine and the fluid might be environmentally isolated from the water column.

According to another aspect of the present invention, there is provided an apparatus for accumulating energy from an oscillating water column, comprising means for transducing the water column oscillations to compress a fluid and means for accumulating the compressed fluid. In this regard, the transducing means might include means for transducing when the water column is rising and means for transducing when the water column is falling.

The transducing means and accumulating means might include first means for compressing a fluid to a first pressure, first means for accumulating the fluid compressed to the first pressure, second means for compressing the fluid from the first pressure to a second pressure, and second means for accumulating the fluid compressed to the second pressure. In this regard, transducing means and the accumulating means might include means for successively compressing and means for successively accumulating fluid at higher pressures.

The apparatus might further include a turbine and means for turning the turbine with the compressed fluid. The apparatus might further include means for environmentally isolating from the water column at least one of the turbine, the fluid, the accumulating means, and the compressing means.

According to another aspect of the present invention, there is provided an apparatus for accumulating energy from an oscillating water column, comprising a first water-cylinder having a first water piston that slides between a first position and a second position in response to oscillation of the water column; a first fluid-cylinder having a first fluid piston that slides between a first position and a second position in response to the first water piston, the first fluid piston being operable to compress a fluid within the first fluid-cylinder; and a first reservoir connected to the first fluid-cylinder for accumulating compressed fluid. At least one of the water-cylinder and the fluid-cylinder might be double-acting.

The apparatus might further include a second fluid-cylinder having a second fluid piston that slides between a first position and a second position and is operable to compress a fluid within the second fluid-cylinder; and a second reservoir connected to the second fluid-cylinder for accumulating compressed fluid, wherein the second fluid-cylinder is connected to receive fluid from the first reservoir and to supply the fluid at a higher pressure to the second reservoir.

The second fluid piston might slide between the first position and the second position in response to the first water piston. Alternatively, the apparatus might further include a second water-cylinder having a second water piston that slides between a first position and a second position in response to oscillation of the water column, wherein the second fluid piston slides between the first position and the second position in response to the second water piston.

The apparatus might further include a turbine coupled to the first reservoir to receive compressed fluid for turning the turbine. The water column might be environmentally isolated from at least one of the turbine, the fluid, the first fluid-cylinder, and the first reservoir.

According to another aspect of the present invention, there is provided an apparatus for accumulating energy from an oscillating water column, comprising a water transducer that generates a force in response to oscillation of the water column; a fluid transducer that compresses a fluid in response to the force; and a reservoir connected to the fluid transducer for accumulating compressed fluid.

The apparatus might further include a turbine coupled to the reservoir to receive compressed fluid for turning the turbine. The water column is environmentally isolated from at least one of: the turbine, the fluid, the fluid transducer, and the reservoir.

According to another aspect of the present invention, there is provided a method of using kinetic energy of an oscillating water column, including transducing the kinetic energy into potential energy and accumulating the potential energy. The method might further include converting the accumulated potential energy to power a machine, for example converting the accumulated potential energy into kinetic energy, such as a fluid flow, perhaps a substantially unidirectional fluid flow.

According to another aspect of the present invention, there is provided an apparatus for using kinetic energy of an oscillating water column, including means for transducing the kinetic energy into potential energy and means for accumulating the potential energy. The apparatus might further include means for converting the accumulated potential energy to power a machine, for example means for converting the accumulated potential energy into kinetic energy, such as a fluid flow, perhaps a substantially unidirectional fluid flow. In this regard, the machine might be a turbine, and in particular a non-self-rectifying turbine.

According to another aspect of the present invention, there is provided a method of using kinetic energy of an oscillating water column, including transducing the kinetic energy and powering a machine with the transduced energy. In this regard powering a machine might include powering a turbine, and in particular a non-self-rectifying turbine. Transducing could include creating a fluid flow, perhaps a substantially unidirectional fluid flow. The method might further include accumulating the fluid.

According to another aspect of the present invention, there is provided an apparatus for using kinetic energy of an oscillating water column, including means for transducing the kinetic energy and means for powering a machine with the transduced energy, for example a turbine, and in particular non-self-rectifying turbine. The transducing means could include means for creating a fluid flow, perhaps a substantially unidirectional fluid flow. The apparatus might further include means for accumulating the fluid.

Further aspects and advantages of the present invention will become apparent upon considering the following drawings, description, and claims.

DESCRIPTION OF THE INVENTION

The invention will be more fully illustrated by the following detailed description of non-limiting specific embodiments in conjunction with the accompanying drawing figures. In the figures, similar elements and/or features may have the same reference label. Further, various elements of the same type may be distinguished by following the reference label with a second label that distinguishes among the similar elements. If only the first reference label is identified in a particular passage of the detailed description, then that passage describes any one of the similar elements having the same first reference label irrespective of the second reference label.

BRIEF DESCRIPTION OF THE DRAWINGS

FIG. 2 is a perspective top view of one embodiment of the transducer of FIG. 1, the transducer having a water-cylinder for receiving energy from the oscillating water column and a fluid-cylinder concentric with the water-cylinder for compressing fluid, the concentric cylinders having sufficient spacing between them to allow air to exit to the atmosphere and re-enter from the atmosphere with minimal impediment.

FIG. 3 is a hidden-line perspective top view of the transducer of FIG. 1.

FIG. 10 is a perspective top view of the fluid-cylinder of FIG. 2, the water-cylinder and water piston being omitted for emphasis.

FIG. 11 is a perspective bottom view of the fluid-cylinder of FIG. 10.

FIG. 12 is a hidden-line top view of the fluid-cylinder of FIG. 10.

FIG. 13 is a hidden-line bottom view of the fluid-cylinder of FIG. 10.

FIG. 14 is a hidden-line side view of the fluid-cylinder of FIG. 10.

FIG. 15 is a longitudinal sectional view of the fluid-cylinder of FIG. 14, viewed along the cutting plane 15-15.

FIG. 16 is a perspective top view of the fluid-cylinder of FIG. 2 and the coupled water piston, the water-cylinder being omitted for emphasis.

FIG. 17 is a perspective bottom view of the fluid-cylinder and the coupled water piston of FIG. 16.

FIG. 18 is a hidden-line top view of the fluid-cylinder and the coupled water piston of FIG. 16.

FIG. 19 is a hidden-line bottom view of the fluid-cylinder and the coupled water piston of FIG. 16.

FIG. 20 is a side view of the fluid-cylinder and the coupled water piston of FIG. 16.

FIG. 21 is a longitudinal sectional view of the fluid-cylinder and the coupled water piston of FIG. 20, viewed along the cutting plane 21-21.

DETAILED DESCRIPTION OF SPECIFIC EMBODIMENTS

(a) Structure of Specific Embodiments

Figure 1:
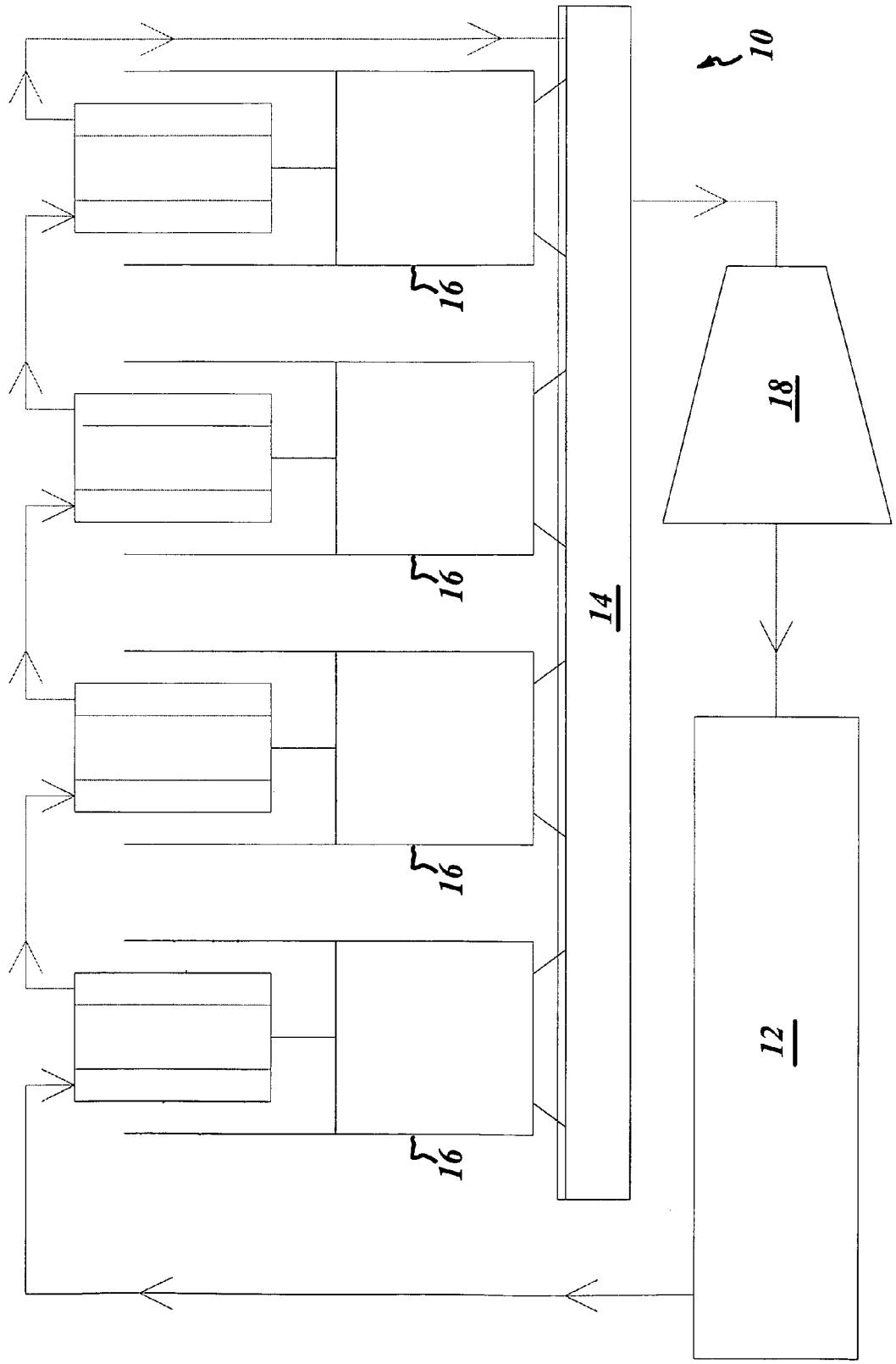
FIG. 1 is a schematic view of one embodiment of an apparatus for accumulating energy from an oscillating water column according to one aspect of the present invention, the apparatus having a low-pressure-float, a high-pressure-float, a plurality of transducers connected together in series between the low-pressure-float and the high-pressure-float to compress fluid received from the low-pressure-float and to supply the compressed fluid to the high-pressure-float, and a turbine-generator-set connected between the high-pressure-float and the low-pressure-float such that compressed fluid expelled from the high-pressure-float into the low-pressure-float flows past the turbine, urging the turbine to develop kinetic energy to drive the generator to generate electricity.
Figure 9:
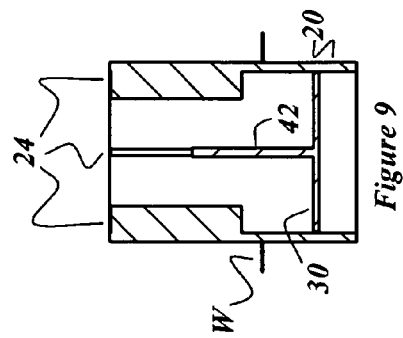
FIG. 9 is a longitudinal-sectional view of the water-cylinder of FIG. 8, viewed along the cutting plane 9-9.
Figure 6:
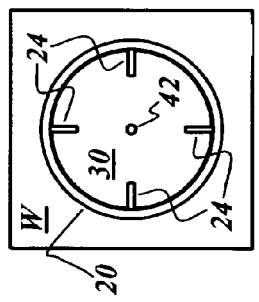
FIG. 6 is a top view of the water-cylinder of FIG. 4.
Figure 8:
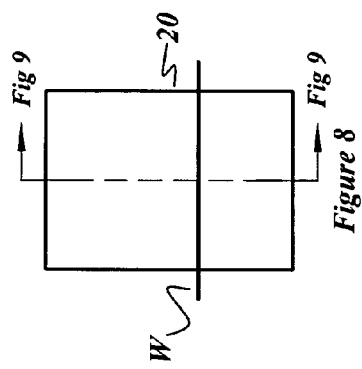
FIG. 8 is a side view of the water-cylinder of FIG. 4.
Figure 7:
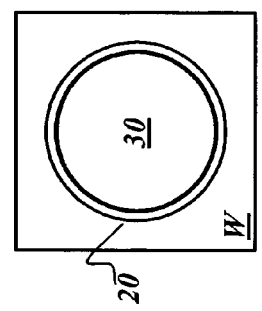
FIG. 7 is a bottom view of the water-cylinder of FIG. 4.
Figure 4:
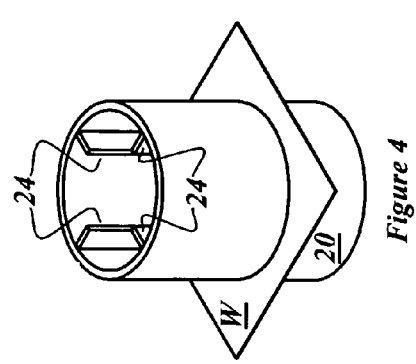
FIG. 4 is a perspective top view of the water-cylinder of FIG. 2, the fluid-cylinder being omitted for emphasis.
Figure 5:
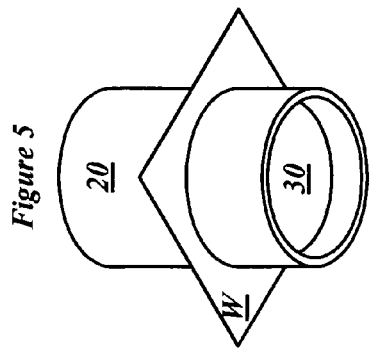
FIG. 5 is a perspective bottom view of the water-cylinder of FIG. 4.
Figure 23:
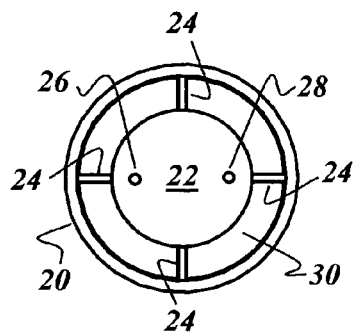
FIG. 23 is a top view of the transducer of FIG. 22.
Figure 24:
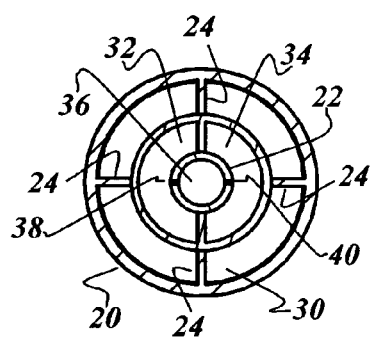
FIG. 24 is a cross-sectional view of the transducer of FIG. 22, viewed along the cutting plane 24-24, illustrating the fluid-cylinder concentric with the water-cylinder and connected to a low-pressure input-reservoir and a high-pressure output-reservoir through respective intake and exhaust valves, for example check valves.
Figure 25:
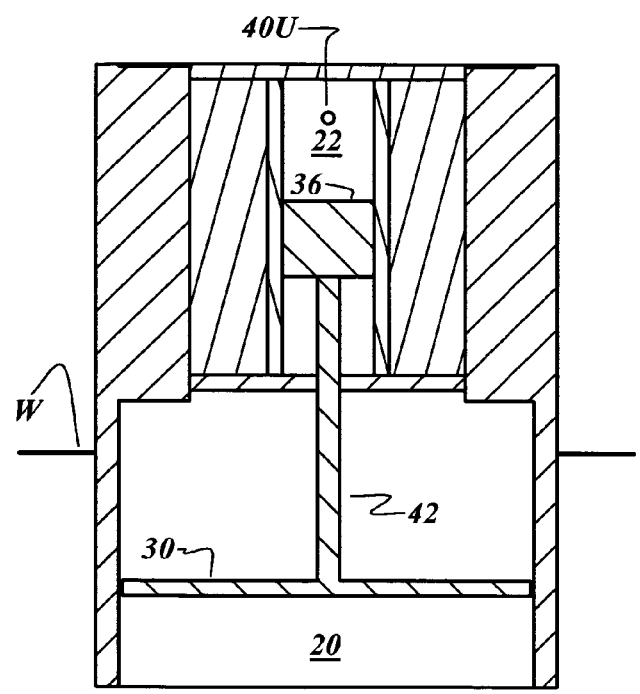
FIG. 25 is a longitudinal-sectional view of the transducer of FIG. 22, viewed along the cutting plane 25-25, and illustrating the fluid piston coupled to receive kinetic energy from the water piston to compress fluid received from the input-reservoir for supply to the output-reservoir.
Figure 22:
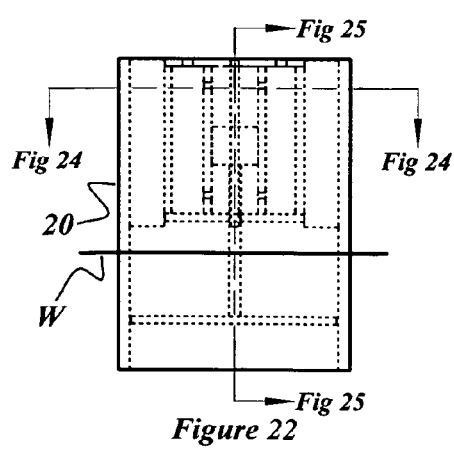
FIG. 22 is a hidden-line side view of the transducer of FIG. 2.

The structure of the invention will now be illustrated by explanation of specific, non-limiting, exemplary embodiments shown in the drawing figures and described in greater detail herein.

(i) The Generating System

FIG. 1 shows an apparatus for accumulating energy from an oscillating water column according to one embodiment of the present invention, generally illustrated at 10. The accumulator 10 includes a low-pressure-float 12 and a high-pressure-float 14 that store a fluid at low and high pressures respectively and that are sufficiently buoyant to support the accumulator 10 at a suitable elevation in a body of water. Those skilled in the art will recognize that this buoyancy might be provided by other means or the accumulator 10 might be suitably elevated by a means other than buoyancy, in which case the floats 12, 14 would function simply to store the fluid. For example, the accumulator 10 might be constructed directly into a shoreline at a suitable elevation or might be built upon pilings. Floats, however, provide the advantage of constant elevation relative to tides.

The accumulator 10 further includes at least one, but generally a plurality of, transducers 16 connected in series between the low-pressure-float 12 and the high-pressure-float 14. The first such transducer 16 is connected to receive fluid at low pressure from the low-pressure-float 12, to compress the fluid, and to supply the compressed fluid to either the next such transducer 16 in series or the high-pressure-float 14, in the case of the last such transducer 16 in the series. One desirable structure for the transducers 16 will be detailed below; however, those skilled in the art will appreciate that various types of transducer 16 might be used.

Finally, the accumulator 10 might also include a machine powered by compressed fluid, in this embodiment a turbine-generator-set 18, in which the turbine is connected between the high-pressure-float 14 and the low-pressure-float 12 such that compressed fluid expelled from the high-pressure-float into the low-pressure-float flows so as to urge the turbine to develop kinetic energy to drive the generator to generate electricity. The turbine-generator-set 18 might be supported by the floats 12, 14 or might be located remotely and connected by piping.

As used herein, the terms "low-pressure" and "high-pressure" and the like are used simply relative to each other, and not in comparison to an external standard. Without limiting the foregoing, it has been found that for the purpose of powering a turbine-generator-set 18, a suitable pressure for fluid in the low-pressure-float 12 is approximately atmospheric pressure, while a suitable pressure for fluid in the high-pressure-float 14 can be in the many hundreds of pounds per square inch.

Again without limiting the generality of the foregoing, it has been found that gases such as dry air or nitrogen and liquids such as fresh water are suitable for use as the fluid. Those skilled in the art will recognize that a gas may be compressed, while a liquid, being essentially incompressible, may instead pressurize a closed-system containing it. An example of the latter arrangement would be to pump a volume of liquid into a resilient reservoir, thus stretching the reservoir beyond its natural volume such that the reservoir will resiliently expel the liquid to return to its natural volume when an opportunity presents itself. For the sake of simplicity, the embodiments are described and the invention is claimed in terms of compressing a fluid; however, as used herein, such terms also connote the analogous arrangement of pressurizing a system or part of a system that contains the fluid.

(ii) The Transducer

FIGS. 2 and 3 show one embodiment of the transducer 16, partially immersed in a body of water W. The transducer 16 includes a water-cylinder 20, a fluid-cylinder 22 and one or more connectors 24 connecting the fluid-cylinder 22 to the water-cylinder 20. In this embodiment, the water-cylinder 20 and the fluid-cylinder 22 are desirably concentric to simplify coupling therebetween as will be further described below; however, concentricity is not necessary.

The fluid-cylinder 22 includes a unidirectional input-port 26 connectable to receive lower pressure fluid from the low-pressure-float 12 or a previous transducer 16 in the series, as the case may be, and a unidirectional output-port 28 connectable to supply higher pressure fluid to the high-pressure-float 14 or a subsequent transducer 16 in the series, as the case may be.

(iii) The Water-Cylinder

FIGS. 4-9 show that the water-cylinder 20 is open at the end that is submerged below the level of the water W, such that the water so contained within the water-cylinder 20 is free to oscillate as a column as a result of wave activity in the body of water W proximate the water-cylinder 20.

The water-cylinder 20 includes a water-piston 30 adapted to slide longitudinally within the water-cylinder 20 under the urging of the oscillating water column and gravity. This arrangement has certain advantages over simple buoyancy devices more conventionally used for harnessing energy from waves in an open body of water. Most notably, because open-water-floats desirably have high buoyancy for harnessing energy in light-wave conditions, such devices generally only harness energy from the rising of a wave, not the falling. In this regard, half the wave is wasted. The configuration described for the water-cylinder allows for a relatively heavier water-piston 30 that can harness energy from rising waves forced through the water-cylinder 20 and energy from the water-piston 30 being drawing back downward by vacuum or gravity as the water retreats from the water-cylinder 20.

The water-cylinder 20 may be open, closed or restricted at the end that is above the level of the water W; however, in general it is desirable that the space above the oscillating water column be relatively open to the atmosphere so that air may freely flow in and out of the water-cylinder 20 instead of resisting the oscillations of the water-piston 30.

(iv) The Fluid-Cylinder

FIGS. 10-15 show the fluid-cylinder 22, desirably remote or otherwise environmentally isolated from the water W to resist corrosion. The fluid-cylinder 22 is enveloped by an input-reservoir 32 connected to receive low-pressure fluid from the input-port 26 and an output-reservoir 34 connected to supply higher-pressure fluid through the output-port 28. The reservoirs 32, 34 respectively store a supply of low-pressure fluid for supply to the fluid-cylinder 22 and a supply of high-pressure fluid from the fluid-cylinder 22, to conveniently provide a smooth and continuous flow of fluid in the wider accumulator 10 system.

The fluid-cylinder 22 further includes a fluid-piston 36 adapted to slide longitudinally within the fluid-cylinder 22, between a downstroke-intake-valve 38-D and an upstroke-exhaust-valve 40-U toward the top end of the fluid-cylinder 22 and an upstroke-intake-valve 38-U and a downstroke-exhaust-valve 40-D toward the bottom end of the fluid-cylinder 22. In this embodiment, the intake-valves 38 are one-way valves connecting the input-reservoir 32 to the fluid-cylinder 22 and the exhaust-valves 40 are one-way valves connecting the fluid-cylinder 22 to the output-reservoir 34. So configured, the fluid-cylinder 22 is double-acting.

Those skilled in the art will recognize that there are many suitable configurations for the fluid-cylinder 22, both in its own right and in combination with the reservoirs 32, 34. For example, either of the reservoirs 32, 34 might fully circumscribe the fluid-cylinder 22 on it own, in which case the other of the reservoirs 32, 34 might abut one or both ends of the fluid-cylinder 22 or might itself be circumscribed or otherwise reside within the fluid-cylinder 22. Either of the reservoirs 32, 34 might even be located remotely from the fluid-cylinder 22 or might even be omitted. Such different configurations would necessitate different configurations for the ports 26, 28 and valves 38, 40, as are well known in the art.

Thus, the fluid-cylinder 22 might be single-acting or double-acting and might have a single fluid-piston 36 compressing fluid against either end of the fluid-cylinder 22 or might have a pair of opposing fluid-pistons (not illustrated) alternately compressing fluid against a reservoir (not illustrated) residing in between them within the fluid-cylinder 22. The connecting-rod 42 might extend from the fluid-piston 36 at only one end, or else it might extend from both ends of the fluid-piston 36 and even pass through both ends of the fluid-cylinder 22, for example to improve balance.

(iv) The Coupling

FIGS. 16-25 show the coupling between the water-cylinder 20 and the fluid-cylinder 22, which are retained relative to each other by the connectors 24. The water-piston 30 and the fluid-piston 36 are coupled through a linkage, in this embodiment a simple connecting-rod 42, such that the water-piston 30 may urge the fluid-piston 36 to move in response to the oscillating water column.

(b) Operation of Specific Embodiments

With reference now to the Figures, the operation of this specific embodiment of the invention will now be described.

As a body of water W crests and troughs in the vicinity of a transducer 16, it encourages a water-column to oscillate up and down within the confines of the water-cylinder 20. As it rises, the water-column urges the water-piston 30 upward with it. As it falls, the weight of the water-column urges the water-piston 30 downward with a maximum force that if exceeded would create a vacuum.

Acting through the connecting-rod 42, the oscillating water-piston 30 urges the fluid-piston 36 to oscillate in tandem. On its downward stroke, the fluid-piston 36 draws low-pressure fluid from the input-reservoir 32 through the downstroke-intake-valve 38-D into the upper portion of the fluid-cylinder 22 and compresses fluid from the lower portion of the fluid-cylinder 22 through the downstroke-exhaust-valve 40-D into the output-reservoir 34. Similarly, on its upward stroke, the fluid-piston draws low-pressure fluid from the input-reservoir 32 through the upstroke-intake-valve 38-U into the lower portion of the fluid-cylinder 22 and compresses fluid from the upper portion of the fluid-cylinder 22 through the upstroke-exhaust-valve 40-U into the output-reservoir 34.

The input-reservoir 32 receives fluid through the input-port 26 and the output-reservoir 34 exhausts fluid through the output-port 28. With a plurality of transducers 16 connected together in series, the output-port 28 of a former transducer 16 is connected to the input-port 26 of a subsequent transducer 16, each succeeding transducer 16 further compressing the fluid. In this way, a series of transducers 16 connected between the low-pressure-float 12 and the high-pressure-float 14 extract low-pressure fluid from the low-pressure-float 12 and supply high-pressure fluid to the high-pressure-float 14.

The turbine-generator-set 18 connected to receive high-pressure fluid from the high-pressure-float 14 and to supply low-pressure fluid to the low-pressure-float 12 extracts energy from the expanding fluid as it interacts with the blades of the turbine, urging the turbine to drive the generator to generate electricity.

(c) Further Variations

Thus, it will be seen from the foregoing embodiments and examples that there has been described a way to accumulate energy from an oscillating column of water. In this regard, both the floats 12, 14 and the reservoirs 32, 34 accumulate compressed fluid as a source of potential energy.

While specific embodiments of the invention have been described and illustrated, such embodiments should be considered illustrative of the invention only and not as limiting the invention as construed in accordance with the accompanying claims. In particular, all quantities described have been determined empirically and those skilled in the art might well expect a wide range of values surrounding those described to provide similarly beneficial results.

It will be understood by those skilled in the art that various changes, modifications and substitutions can be made to the foregoing embodiments without departing from the principle and scope of the invention expressed in the claims made herein.

For example, one might choose to build an accumulator 10 having only one transducer 16 or a group of transducers 16 in parallel, as may be desirable when pressurizing a liquid. As another example, one might drive more than one fluid-cylinder 22 with the same water-cylinder 20, all sharing the same connecting-rod 42 for example, perhaps to achieve desired fluid properties through series and/or parallel combination of standard cylinders rather than building one or more custom cylinders.

Furthermore, although the advantages of a completely closed system have been described, some applications might be suitably implemented with a system that isn't completely closed, for example a system where the fluid expelled from the high-pressure-float 14 to drive the turbine-generator-set 18 doesn't flow back to the low-pressure-float 12, which either is omitted or else sources fresh fluid from the environment.

Although the invention has been described as having particular application for generating electricity, those skilled in the art will recognize it has wider application, for example for driving machines, such as hydraulic or compressed-gas machines, for simply compressing or pumping fluid, or for reverse osmosis filtration, which would suggest a suitable pressure for fluid in the high-pressure-float 14 of approximately 900 pounds per square inch.

Broadly, the water-piston 30 and connecting-rod 42 could be used to power a wide range of machines. For purposes of energy transduction, the connecting-rod 42 might for example move a magnet back and forth through a metal coil to generate electricity or might wind a spring or lift a weight to accumulate potential energy.

What is claimed is:

1. An apparatus for accumulating energy from an oscillating water column, comprising:
   a) a first water-cylinder having a first water piston that slides between a first position and a second position in response to oscillation of the water column;
   b) a first fluid-cylinder having a first fluid piston that slides between a first position and a second position in response to the first water piston, the first fluid piston being operable to compress a fluid within the first fluid-cylinder;
   c) a first reservoir connected to the first fluid-cylinder for accumulating compressed fluid;
   d) a second fluid-cylinder having a second fluid piston that slides between a first position and a second position and is operable to compress a fluid within the second fluid-cylinder; and
   e) a second reservoir connected to the second fluid-cylinder for accumulating compressed fluid, wherein the second fluid-cylinder is connected to receive fluid from the first reservoir and to supply the fluid at a higher pressure to the second reservoir,
   wherein at least one of the first water-cylinder and the first fluid-cylinder is double-acting.

2. An apparatus as claimed in claim 1, wherein the second fluid piston slides between the first position and the second position in response to the first water piston.

3. An apparatus as claimed in claim 1, further comprising a second water-cylinder having a second water piston that slides between a first position and a second position in response to oscillation of the water column, wherein the second fluid piston slides between the first position and the second position in response to the second water piston.

4. An apparatus as claimed in claim 1, further comprising a turbine coupled to the first reservoir to receive compressed fluid for turning the turbine.

5. An apparatus as claimed in claim 4, wherein the water column is environmentally isolated from at least one of: a) the turbine, b) the fluid, c) the first fluid-cylinder; and d) the first reservoir.

* * * * *